United States Patent [19]

Wölfl

[11] Patent Number: 4,905,516

[45] Date of Patent: Mar. 6, 1990

[54] WALL THICKNESS MEASURING DEVICE FOR PIPES, CABLE CASINGS AND THE LIKE, MORE PARTICULARLY OF EXTRUDED PLASTICS

[75] Inventor: Volkmar Wölfl, Vlotho-Valdorf, Fed. Rep. of Germany

[73] Assignee: Inoex GmbH Innovationen und Ausrustungen fur die Extrusionstechnik, Bad Oeynhausen, Fed. Rep. of Germany

[21] Appl. No.: 299,295

[22] Filed: Jan. 23, 1989

[30] Foreign Application Priority Data

Feb. 12, 1988 [DE] Fed. Rep. of Germany ....... 3804388

[51] Int. Cl.[4] ............................................. G01N 29/04
[52] U.S. Cl. ........................................ 73/622; 73/637
[58] Field of Search ................ 73/618, 622, 637, 640, 73/641; 264/23, 40.1, 40.7; 425/141

[56] References Cited

U.S. PATENT DOCUMENTS 3,955,425  5/1976  Corneau ................................. 73/622
4,328,708  5/1982  Bagwell ................................. 73/622

FOREIGN PATENT DOCUMENTS 56-47756  4/1981  Japan .................................... 73/637
0446828  11/1974  U.S.S.R. ............................... 73/637
0739395  6/1980  U.S.S.R. ............................... 73/637

Primary Examiner—John Chapman
Assistant Examiner—Louis M. Arana
Attorney, Agent, or Firm—Sprung, Horn Kramer & Woods

[57] ABSTRACT

The invention relates to a wall thickness measuring device for pipes and the like, more particularly of extruded plastics, having a measuring head (15) connected to measuring and supply leads. The measuring head is mounted to be reversed around an opening of passage A for the pipe to be measured by means of a guide (14) attached to a frame having the opening of passage. The measure and supply leads (22-25) are acommodated in two guide chains (20, 21) which extend in opposite directions, partly on an inner guideway (18) and the other part on a guideway (19), connected thereto, of a guide core member (17). The guide core member (17) is basically constructed in the form of a portion of a circle and is disposed concentrically of the opening of passage (5) and can be moved therearound. Ends (26, 27) of the part of the guide chains (20, 21) disposed on the outer guideway (19) are coupled to a fixed point of the guide (14), the ends (28, 29) of the parts of the guide chains (20, 21) disposed on the inner guideway (18) being coupled to the movable measuring head (15).

5 Claims, 3 Drawing Sheets

WALL THICKNESS MEASURING DEVICE FOR PIPES, CABLE CASINGS AND THE LIKE, MORE PARTICULARLY OF EXTRUDED PLASTICS

BACKGROUND OF THE INVENTION

1. Field of the Invention

The invention relates to a wall thickness measuring device for pipes, cable casings and the like, more particularly of extruded plastics, having a measuring head which is connected to measuring and supply leads and is mounted to reverse around an opening of passage for the pipe to be measured on a guide attached to a frame having the opening of passage.

2. Discussion of Prior Art

In known wall thickness measuring devices operating on the ultrasonics principle the sensor is forced against the pipe by means of a pressure-operated approach device, using a probe-to-specimen contact medium, more particularly water. Since due to the required measurement of the wall thickness the measuring head is mounted to be reversed over the whole periphery, the measuring and supply leads extend fairly freely. One prior art device provides for the leads a winding frame which can be moved reversibly together with the measuring head. However, the winding frame guides the leads only in the immediate zone of the opening of passage, while the leads otherwise extend freely (Reprint from the Journal: "Kunststoffe, 77, 1987/9, Published by Carl Hanser Verlag, Munich; "Automatic ultrasonics wall thickness measurement in pipe extrusion" by J. Orzechowski, Bad Oeynhausen; Company Publication of Battenfeld Extrusionstechnik GmbH "Automation of pipe extrusion", pages 10 and 11).

In another wall thickness measuring device of the kind specified the measuring head, which has an oscillator, is borne by a rotably mounted hollow shaft which also bears a primary winding and a secondary winding of high frequency transformers. The oscillator is connected to the windings disposed on the hollow shaft via cables laid in the measuring head and in bores in the hollow shaft. Unlike the first-mentioned prior art, no measuring and supply leads are provided to connect the movable measuring head to a fixed measuring device (German AS 1 239 484).

SUMMARY OF THE INVENTION

The invention relates to the problem of providing a wall thickness measuring device in which the measuring and supply leads for the measuring head extend in a clearly-defined manner over their total length.

In a wall thickness measuring device of the kind specified, this problem is solved according to the invention by the features that the measuring and supply leads are accomodated in two guide chains which extend in opposite directions, partly on an inner guideway and the other part on an outer guideway connected thereto; the guideways are formed on the inner and outer generated surfaces of a guide core member which has substantially the shape of a portion of a circle and is disposed concentrically of the opening of passage and is mounted for movement therearound; and the ends of the parts of the guide chains disposed on the outer guideway are coupled to a fixed point of the guide, the ends of the parts of the guide chains disposed on the inner guideway being coupled to the movable measuring head.

According to the invention the measuring and supply leads extend in a clearly-defined manner over their total length between the fixed point on the frame and the connecting point on the movable measuring head. Little space is taken up by the measuring and supply leads and guide chains extending in two concentric layers. Moreover, the weight is distributed uniformly over the periphery, so that equally small forces are adequate for adjustment over the whole periphery. The measuring and supply leads are subjected to minimum stress, since the special guiding by the guide chains prevents the occurence of any stressing peaks or any very small buckling radii.

According to the first embodiment of the invention the guide chains together with the guide core member are disposed in a flat hollow cylindrical box forming their guide. In a box of this kind the plate-like guide core member can bear against the box end walls via spacing elements. A suitable combination of materials as between the guide core member, the guide chains, the spacing elements and the box enables friction between the parts moving in relation to one another to be kept low. For example, the box can have sliding linings of polyamide.

According to another feature of the invention, the box can also form the guide for the measuring head. More particularly, a bush acting as a carrier for the measuring head can be rotatably mounted in the central opening of the hollow cylindrical box.

DESCRIPTION OF AN EMBODIMENT OF THE INVENTION

An embodiment of the invention will now be explained in greater detail with reference to the accompanying diagrammatic drawings.

DETAILED DESCRIPTION OF THE EMBODIMENT OF THE INVENTION

Figure 1:
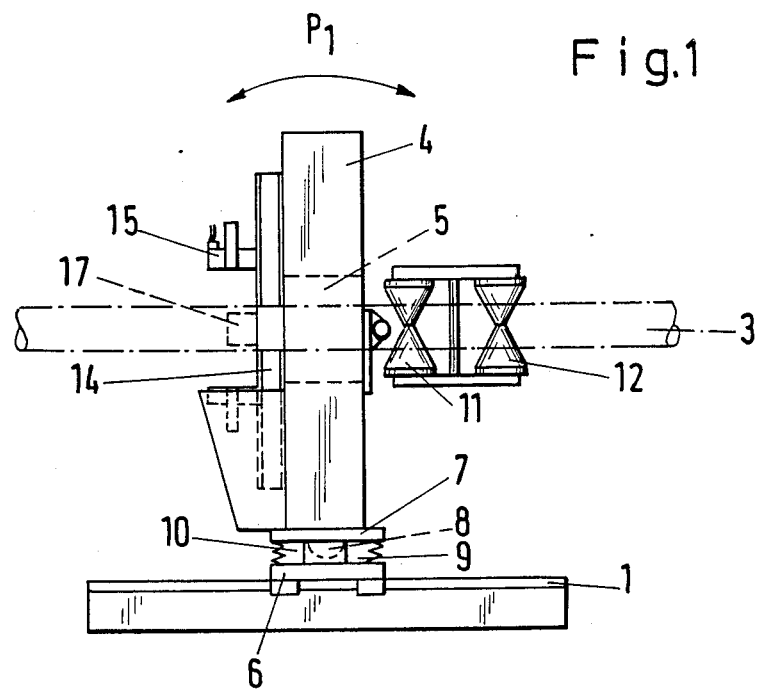
FIG. 1 is a side elevation of a wall thickness measuring device.
Figure 2:
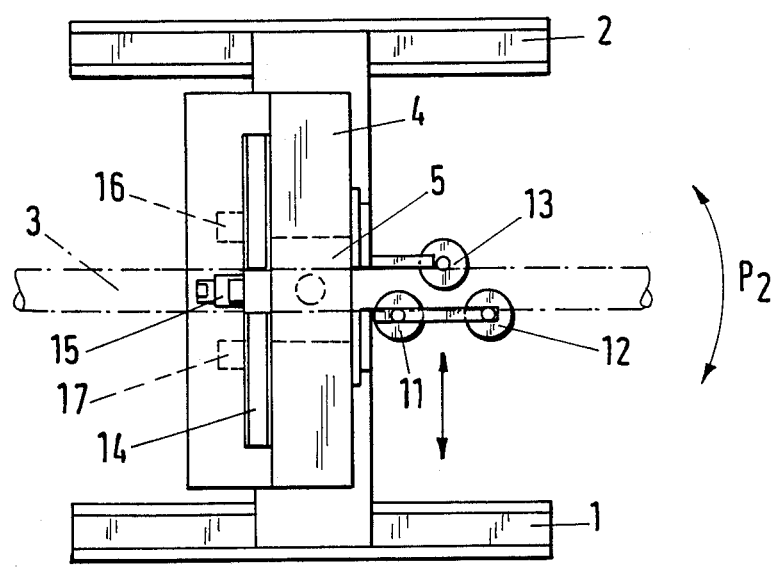
FIG. 2 is a plan view of the wall thickness measuring device shown in FIG. 1.

Referring to FIGS. 1 and 2, a wall thickness measuring device has a frame 4 which can be driven on rails 1, 2 parallel with the conveying direction of an extruded pipe 3 and is formed with an opening of passage 5 for the pipe 3. Via a pivoting bearing 8 disposed between baseplates 6, 7 the frame 4 can move in the direction indicated by arrows $P_1$, $P_2$ against the force of supporting springs 9, 10 disposed between the baseplates 6, 7.

On the side where the pipe 3 enters the frame 4, the frame 4 bears three conical rollers 11–13 which clamp the pipe 3 between themselves. The two conical rollers 11, 12 can be adjusted against the pipe 3 and then fixed rigidly, while the conical roller 13 can be adjusted against the pipe 3 and is then borne resiliently.

Figure 3:
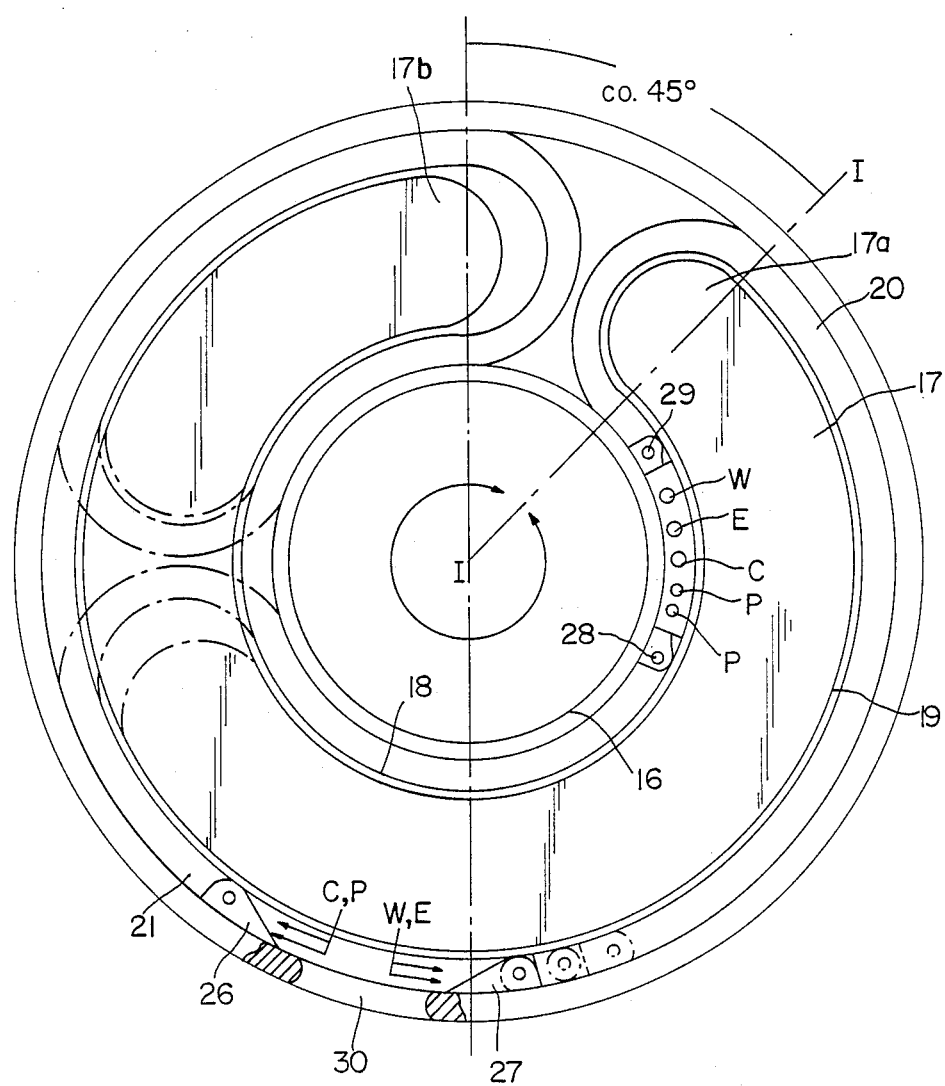
FIG. 3 is an elevation of that part of the wall thickness measuring device shown in FIG. 1 which receives the measuring and supply leads and guides the measuring head.
Figure 4:
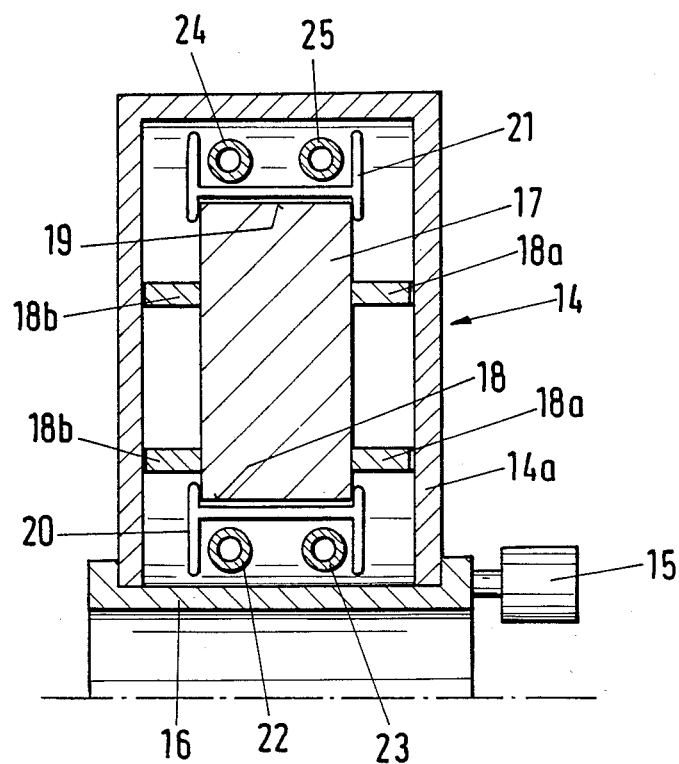
FIG. 4 shows the part illustrated FIG. 3 in an axial half-section taken along the line I—I.

Referring to FIGS. 3 and 4, the frame 4 bears on the discharge side a flat hollow cylindrical box 14 which acts as a guide for a reversibly rotating testing head 15 and measuring and supply leads 22–25 extending thereto. Disposed in the central opening of the hollow cylindrical box 14 is a guide core member 17 in the form of a plate-shaped portion of a circle, whose ends 17a, 17b are rounded and which bears via spacing elements 18a, 18b against the two end wall 14a, 14b of the box. By its inner and outer generated surfaces the guide core member 17 forms guideways 18, 19 for two guide chains 20, 21 which extend in opposite directions and in which the measuring and supply leads 22-25 are disposed. While the outer ends 26, 27 of the two guide chains 20, 21 are secured to the box 14, the inner ends 28, 29 of the two guide chains 20, 21 are attached, together with the inner ends W, E, C, P of the supply and measuring leads 22-25 for the measuring head 15 and its adjusting members, to the rotatable bush 16. Because of the length of chains 20, 21, the inner ends 28, 29 cannot enter the range of about 45° as shown in FIG. 3. An introduction aperture 30 for the measuring and supply leads 22-25 (not shown in FIG. 3) is provided in the box 14 in the zone between the outer ends 26, 27 of the guide chains 20, 21. The measuring and supply leads 22-25 introduced at this place are divided up between the two guide chains 20, 21 extending to opposite directions.

The reversible drive of the bush 16 and therefore the measuring head is not shown in the drawings, but it can in known manner take the form of a belt drive running over a pulley attached to the bush 16.

What is claimed is:

1. A device for measuring the wall thickness of a workpiece, comprising: a frame having a passage for receiving a workpiece to be measured; a guide connected to the frame; a measuring head connected to measuring and supply leads; means mounting the measuring head on the guide for movement around the passage; wherein the guide comprises a guide core member having substantially the shape of a portion of a circle and mounted concentrically of the passage for movement therearound, wherein the guide core member has inner and outer surfaces defining inner and outer guideways, two guide chains extending in opposite directions partly on the inner and outer guideways, the two guide chains having means for accommodating the measuring and supply leads, and wherein two ends of the two guide chains are fixedly connected to the outer guideway and two ends of the two guide chains are connected to the measuring head for movement therewith to effect movement of the guide core member.

2. The device according to claim 1, wherein the guide comprises a flat hollow cylindrical box in which the guide core member and chains are disposed.

3. The device according to claim 2, wherein the box has end walls and wherein the guide core member comprises a plate with spacing elements disposed against the end walls.

4. The device according to claim 2, wherein the box has a central aperture.

5. The device according to claim 2, wherein the means mounting the measuring head comprises a bush carrying the measuring head and rotatably mounted in the central aperture.

* * * * *